(12) United States Patent
Miao et al.

(10) Patent No.: US 8,508,851 B2
(45) Date of Patent: Aug. 13, 2013

(54) COMPACT SEE-THROUGH DISPLAY SYSTEM

(75) Inventors: Xiaoyu Miao, Sunnyvale, CA (US); Adrian Wong, Mountain View, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 13/187,283

(22) Filed: Jul. 20, 2011

(65) Prior Publication Data

US 2013/0021658 A1    Jan. 24, 2013

(51) Int. Cl.
G02B 27/10   (2006.01)
G02B 27/14   (2006.01)
G09G 5/00    (2006.01)

(52) U.S. Cl.
USPC ............ 359/618; 359/629; 359/633; 359/630; 345/8

(58) Field of Classification Search
USPC ............... 359/256, 630, 631, 633, 636, 641, 359/464, 485.01, 485.02, 489.08; 345/7–9, 345/156, 633; 353/7, 20, 30, 31, 37; 348/158, 348/E7.085
See application file for complete search history.

(56) References Cited

U.S. PATENT DOCUMENTS

| | | | |
|---|---|---|---|
| 5,526,184 A | 6/1996 | Tokuhashi et al. |
| 5,715,337 A | 2/1998 | Spitzer et al. |
| 5,886,822 A | 3/1999 | Spitzer |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |

(Continued)

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

Primary Examiner — Loha Ben
(74) Attorney, Agent, or Firm — McDonnell Boehnen Hulbert & Berghoff LLP

(57) ABSTRACT

An optical system includes a display panel, an image former, a viewing window, a proximal beam splitter, and a distal beam splitter. The display panel is configured to generate a light pattern. The image former is configured to form a virtual image from the light pattern generated by the display panel. The viewing window is configured to allow outside light in from outside of the optical system. The virtual image and the outside light are viewable along a viewing axis extending through the proximal beam splitter. The distal beam splitter is optically coupled to the display panel and the proximal beam splitter and has a beam-splitting interface in a plane that is parallel to the viewing axis. A camera may also be optically coupled to the distal beam splitter so as to be able to receive a portion of the outside light that is viewable along the viewing axis.

35 Claims, 5 Drawing Sheets

(56) References Cited

U.S. PATENT DOCUMENTS

| | | | |
|---|---|---|---|
| 6,570,711 | B2 * | 5/2003 | Ducellier ............... 359/629 |
| 6,618,099 | B1 | 9/2003 | Spitzer |
| 6,693,749 | B2 | 2/2004 | King et al. |
| 6,701,038 | B2 | 3/2004 | Rensing et al. |
| 6,724,354 | B1 | 4/2004 | Spitzer et al. |
| 6,879,443 | B2 | 4/2005 | Spitzer et al. |
| 7,158,096 | B1 | 1/2007 | Spitzer |
| 7,192,136 | B2 | 3/2007 | Howell et al. |
| 7,242,527 | B2 | 7/2007 | Spitzer et al. |
| 7,255,437 | B2 | 8/2007 | Howell et al. |
| 7,380,936 | B2 | 6/2008 | Howell et al. |
| 7,401,918 | B2 | 7/2008 | Howell et al. |
| 7,438,410 | B1 | 10/2008 | Howell et al. |
| 7,457,040 | B2 | 11/2008 | Amitai |
| 7,481,531 | B2 | 1/2009 | Howell et al. |
| 7,500,746 | B1 | 3/2009 | Howell et al. |
| 7,500,747 | B2 | 3/2009 | Howell et al. |
| 7,543,934 | B2 | 6/2009 | Howell et al. |
| 7,581,833 | B2 | 9/2009 | Howell et al. |
| 7,621,634 | B2 | 11/2009 | Howell et al. |
| 7,663,805 | B2 | 2/2010 | Zaloum et al. |
| 7,672,055 | B2 | 3/2010 | Amitai |
| 7,677,723 | B2 | 3/2010 | Howell et al. |
| 7,724,443 | B2 | 5/2010 | Amitari |
| 7,751,122 | B2 | 7/2010 | Amitai |
| 7,760,898 | B2 | 7/2010 | Howell et al. |
| 7,771,046 | B2 | 8/2010 | Howell et al. |
| 7,792,552 | B2 | 9/2010 | Thomas et al. |
| 7,806,525 | B2 | 10/2010 | Howell et al. |
| 7,843,403 | B2 | 11/2010 | Spitzer |
| 7,900,068 | B2 | 3/2011 | Weststrate et al. |
| 7,922,321 | B2 | 4/2011 | Howell et al. |
| 8,004,765 | B2 | 8/2011 | Amitai |
| 8,109,629 | B2 | 2/2012 | Howell et al. |
| 2003/0090439 | A1 | 5/2003 | Spitzer et al. |
| 2004/0233488 | A1 | 11/2004 | Kasai et al. |
| 2005/0174651 | A1 | 8/2005 | Spitzer et al. |
| 2006/0192306 | A1 | 8/2006 | Giller et al. |
| 2006/0192307 | A1 | 8/2006 | Giller et al. |
| 2008/0219025 | A1 | 9/2008 | Spitzer et al. |
| 2009/0122414 | A1 | 5/2009 | Amitari |
| 2010/0046070 | A1 | 2/2010 | Mukawa |
| 2010/0103078 | A1 | 4/2010 | Mukawa et al. |
| 2010/0149073 | A1 | 6/2010 | Chaum et al. |
| 2010/0254018 | A1 | 10/2010 | Burke |
| 2010/0278480 | A1 | 11/2010 | Vasylyev et al. |
| 2011/0075257 | A1 * | 3/2011 | Hua et al. ............... 359/464 |
| 2011/0227820 | A1 | 9/2011 | Haddick et al. |
| 2013/0033756 | A1 * | 2/2013 | Spitzer et al. .......... 359/630 |
| 2013/0063486 | A1 * | 3/2013 | Braun et al. ............ 345/633 |
| 2013/0069985 | A1 * | 3/2013 | Wong et al. ............ 345/633 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

PCT International Search Report and Written Opinion, PCT International Application No. PCT/US2012/045309 dated Jan. 21, 2013.

Cakmakci, Ozan et al., "Head-Worn Displays: A Review," Journal of Display Technology, vol. 2, pp. 199-216, 2006.

* cited by examiner

COMPACT SEE-THROUGH DISPLAY SYSTEM

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the user's experience of the real world.

By placing an image display element close to the user's eye(s), an artificial image can be made to overlay the user's view of the real world. Such image display elements are incorporated into systems also referred to as "near-eye displays", "head-mounted displays" (HMDs) or "heads-up displays" (HUDs). Depending upon the size of the display element and the distance to the user's eye, the artificial image may fill or nearly fill the user's field of view.

SUMMARY

In a first aspect, an optical system is provided. The optical system includes a display panel, an image former, a viewing window, a proximal beam splitter, and a distal beam splitter. The display panel is configured to generate a light pattern, and the image former is configured to form a virtual image from the light pattern generated by the display panel. The viewing window is configured to allow outside light in from outside of the optical system. The outside light and the virtual image are viewable along a viewing axis through the proximal beam splitter. The distal beam splitter is optically coupled to the display panel and the proximal beam splitter. In addition, the distal beam splitter has a beam-splitting interface in a plane that is parallel to the viewing axis.

In a second aspect, a head-mounted display is provided. The head-mounted display includes a head-mounted support and an optical system attached to the head-mounted support. The optical system includes: (a) a display panel configured to generate a light pattern; (b) an image former configured to form a virtual image from the light pattern generated by the display panel; (c) a viewing window configured to allow outside light in from the outside of the optical system; (d) a proximal beam splitter through which the outside light and the virtual image are viewable along a viewing axis; and (e) a distal beam splitter optically coupled to the display panel and the proximal beam splitter. The distal beam splitter has a beam-splitting interface in a plane that is parallel to the viewing axis.

In a third aspect, a wearable computing device is provided. The wearable computing device includes a head-mounted support, an optical system attached to the head-mounted support, and a computer. The optical system includes: (a) a display panel configured to generate a light pattern; (b) an image former configured to form a virtual image from the light pattern generated by the display panel; (c) a viewing window configured to allow outside light in from the outside of the optical system; (d) a proximal beam splitter through which the outside light and the virtual image are viewable along a viewing axis; and (e) a distal beam splitter optically coupled to the display panel and the proximal beam splitter. The distal beam splitter has a beam-splitting interface in a plane that is parallel to the viewing axis. The computer is configured to control the display panel in the optical system.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The disclosure herein generally relates to a compact see-through display system that may be utilized in a wearable computer system. The wearable computing system may provide an augmented reality experience in which a computer-generated image overlays a portion of the user's real-world field of view. The computer-generated image may include, for example, data, alerts or indications relating to the user's environment, and/or menu options that the user can select or navigate through in various ways.

1. Optical System with Horizontally-Mounted Display Panel

Figure 1:
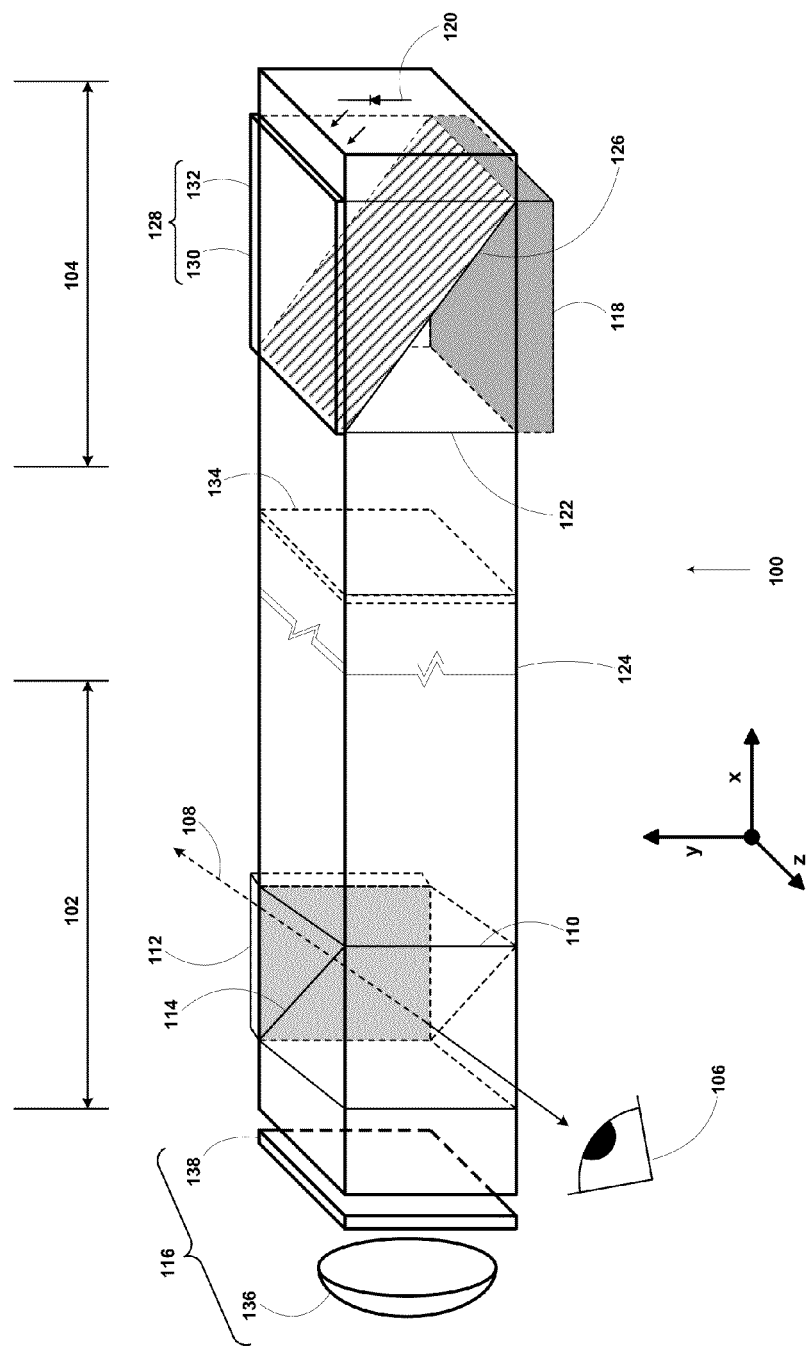
FIG. 1 is a perspective schematic view of an optical system, in accordance with a first example embodiment.

FIG. 1 shows a perspective schematic drawing of a first optical system 100. For purposes of illustration, optical system 100 is described in terms of a proximal portion 102 and a distal portion 104. In typical operation, the proximal portion 102 is proximal to an observer 106, whereas the distal portion 104 is located some distance away from observer 106. In the example illustrated in FIG. 1, optical system 100 extends horizontally (e.g., along the x-axis indicated in FIG. 1) such that distal portion 104 is to the right of proximal portion 102 from the perspective of observer 106. It is to be understood, however, that other configurations are possible. For example, distal portion 104 could be to the left of proximal portion 102, or optical system 100 could extend vertically, with distal portion 104 located above or below proximal portion 102. Other configurations are also possible.

Optical system 100 is able to generate a virtual image that is viewable, e.g., by observer 106, along a viewing axis 108 extending through proximal portion 102. Observer 106 may also view the observer's real-world environment along viewing axis 108. In an example embodiment, the real-world environment and the virtual image are viewable simultaneously. For example, the virtual image may overlay a portion of the observer's view of the real-world environment. The virtual image could appear to observer 106 to be located at or near infinity. Alternatively, the virtual image could appear to be located within the immediate surroundings of observer 106. For example, the apparent distance of the virtual image could be in the range of about 0.5 to 4 meters.

In an example embodiment, viewing axis 106 corresponds to the z-axis and passes through a proximal beam splitter 110 that has faces parallel to the xy, xz, and yz planes. Observer 106 may be located on one side of proximal beam splitter 110, and the other side of proximal beam splitter 110 may be provided with a viewing window 112 that allows light into proximal beam splitter 110 from outside of optical system 100. In this way, observer 106 is able to view the real world through viewing window 112 and proximal beam splitter 110, along viewing axis 108.

Proximal beam splitter 110 includes a proximal beam-splitting interface 114 that is configured to combine light entering proximal beam splitter 110 through viewing window 112 with light from the virtual image generated by optical system 100, so that both the real-world environment and the virtual image can be viewed along viewing axis 108. For example, proximal beam-splitting interface 114 may be in a plane that intersects viewing axis 108 at an angle, such as a 45-degree angle.

In an example embodiment, proximal beam-splitting interface 114 is configured to transmit the light entering through viewing window 112 so that it is viewable along viewing axis 108 and to reflect the light corresponding to the virtual image so that it is also viewable long viewing axis 108. In this regard, proximal beam splitter 110 may be optically coupled to an image former 116, which may be located in proximal portion 102 as shown in FIG. 1. Image former 116 may direct light corresponding to the virtual image in the direction of the x-axis. Thus, the light from outside entering through viewing window 112 may propagate in the z-direction so that it is transmitted through beam-splitting interface 114 toward observer 106, and the light corresponding to the virtual image may propagate in the x-direction until it is reflected towards observer 106 by beam-splitting interface 114.

In the example illustrated in FIG. 1, proximal beam splitter 110 is a 45-degree beam splitter. Thus, proximal beam-splitting interface 114 is in a plane that forms 45-degree angles with the faces of beam splitter 110 that are in the xy-plane and yz-pane and is perpendicular to the faces in the xz-plane. As a result, proximal beam-splitting interface 114 intersects the viewing axis 106 (corresponding to the z-axis) at 45 degrees. It is to be understood, however, that other angles are possible.

In an example embodiment, proximal beam splitter 110 is a polarizing beam splitter, in which beam-splitting interface 114 preferentially transmits p-polarized light and preferentially reflects s-polarized light. With this configuration, the light from outside that is viewable along viewing axis 108 is p-polarized and the light that is viewable along viewing axis 108 as the virtual image is s-polarized. In order to prevent stray light in optical system 100, viewing window 112 may include a linear polarizer that selectively transmits p-polarized light. Further, as described below, the light corresponding to the virtual image may be s-polarized when it is incident on beam-splitting interface 114.

Optical system 100 includes a display panel 118 that is configured to generate a light pattern from which the virtual image is formed. The display panel 118 may be an emissive display such as an Organic Light Emitting Diode (OLED) display. Alternatively, the display panel 118 may be a Liquid-Crystal on Silicon (LCOS) or a micro-mirror display such as a Digital Light Projector (DLP) that generates the light pattern by spatially modulating light from a light source 120. The light source 120 may include, for example, one or more light-emitting diodes (LEDs) and/or laser diodes. The light pattern generated by display panel 118 could be monochromatic, or it could include multiple colors (such as red, green, and blue) to provide a color gamut for the virtual image.

As shown in FIG. 1, display panel 118 and light source 120 may be located in distal portion 104 and optically coupled to a distal beam splitter 122. Distal beam splitter 122 is, in turn, optically coupled to proximal beam splitter 110, for example, via a light pipe 124. In an example embodiment, distal beam splitter 122 has faces that are parallel to the xy, xz, and yz planes and includes a distal beam-splitting interface 126.

In the example shown in FIG. 1, distal beam-splitting interface 126 is in a different plane than proximal beam-splitting interface 114. In particular, whereas proximal beam-splitting interface 114 intersects viewing axis 108 at an angle (e.g., a 45-degree angle), distal beam-splitting interface 126 is in a plane that is parallel to viewing axis 108. Thus, in the embodiment shown, distal beam-splitting interface 126 is in a plane that is perpendicular to the xy faces of distal beam splitter 122 and forms an angle (such as a 45-degree angle) with the xz and yz faces of distal beam splitter 122. It is to be understood that the 45-degree angle formed by distal beam-splitting interface 122 is exemplary only. Other angles could be used.

It is to be understood, however, that the orientation of distal beam-splitting interface 126 that is shown in FIG. 1 and described is merely one example. For example, distal beam-splitting interface 126 could be in a plane that is parallel or perpendicular to proximal beam-splitting interface 114.

In the configuration illustrated in FIG. 1, display panel 118 is horizontally-mounted underneath distal beam splitter 122. Display panel 118 is mounted on a circuit board (not shown) that may include, for example, electronics for driving the display panel 118 and connectors for connecting display panel 118 to other components. The circuit board may extend horizontally underneath optical system 100 (i.e., from distal portion 104 toward proximal portion 102). Thus, the configuration shown in FIG. 1 can beneficially provide a compact design for optical system 100. A similarly compact design can be achieved by placing display panel 118 above distal beam splitter 122 so that its circuit board extends horizontally above optical system 100.

With display panel 118 located underneath distal beam splitter 122, light source 120 may be located at one side of distal beam splitter 122, and a reflector 128 may be located above distal beam splitter 122. With this configuration, light from light source 120 reaches display panel 118 via reflector 128. In particular, distal beam-splitting interface 126 reflects at least a portion of the light from light source 120 toward reflector 128. Reflector 128 reflects the light from light source 120 so that it propagates toward distal beam-splitting interface 126. Distal beam-splitting interface 126 transmits at least a portion of the light reflected from reflector 128 so that it reaches display panel 118. Display panel 118 spatially modulates the incident light, and distal beam-splitting interface 126 reflects at least a portion of the spatially-modulated light from display panel 118 toward proximal beam splitter 110. Proximal beam-splitting interface 114 transmits at least a portion of the spatially-modulated light so that it reaches image former 116. Image former 116 then forms a virtual image from the spatially-modulated light, and proximal beam-splitting interface reflects the light from image former 116 so that the virtual image is viewable along viewing axis 108.

In an example embodiment, distal beam splitter 122 is a polarizing beam splitter, in which distal beam-splitting interface 126 preferentially reflects s-polarized light and preferentially transmits p-polarized light. In that case, light source 120 may include a linear polarizer that selectively transmits s-polarized light. The s-polarized light from light source 120 is preferentially reflected by distal beam-splitting interface 126 towards the reflector 128. The reflector 128 may include a plane mirror 130 and a quarter-wave plate 132, such that light passes through the quarter-wave plate 132 before and after being reflected by the plane mirror 130. After interacting with reflector 128 in this way, the light that is reflected back towards the distal beam splitter 122 has a polarization that is perpendicular to the polarization of the light incident upon the reflector 128. Thus, the light incident on reflector 128 is s-polarized and the light reflected back towards the distal beam splitter 122 is p-polarized.

Distal beam-splitting interface 126 transmits the p-polarized light from reflector 128 so that it is incident on display panel 118. In this example, display panel 118 is a liquid crystal on silicon (LCOS) display panel. As such, display panel 118 spatially modulates the incident p-polarized light and also changes its polarization. Thus, in this example, the display panel 118 converts the incident p-polarized light into a spatially-modulated light pattern of s-polarized light.

Distal beam-splitting interface 126 reflects the s-polarized spatially-modulated light from display panel 118 toward proximal beam splitter 110. In the case that proximal beam splitter 110 is also a polarizing beam splitter, a half-wave plate 134 may be located in the light path between distal beam splitter 122 and proximal beam splitter 110. The half-wave plate 134 converts the s-polarized light into p-polarized light. As a result, the spatially-modulated light that is incident on proximal beam splitter 110 is p-polarized. Proximal beamsplitting interface 114 transmits the p-polarized spatially-modulated light so that it reaches image former 116.

In this example, image former 116 includes a concave mirror 136 and a quarter-wave plate 138. The p-polarized spatially-modulated light pattern passes through quarter-wave plate 136 and is reflected by concave mirror 136. After reflection by concave mirror 136, the light passes back through the proximal quarter-wave plate 132. After the light pattern interacts with the image former 116 in this way, the polarization is changed to s-polarization and the light pattern is viewable as a virtual image. Proximal beam-splitting interface 114 reflects the light from image former 116 so that the virtual image formed by image former 116 is viewable along viewing axis 106. As an alternative to the concave mirror 136, a Fresnel reflector may be used.

Although an example is described above in which both proximal beam splitter 110 and distal beam splitter 122 are polarizing beam splitters, it is to be understood that proximal beam splitter 110 and/or distal beam splitter 122 could be non-polarizing beam splitters. For example, proximal beam splitter 110 could be a non-polarizing 80-20 beam splitter, in which proximal beam-splitting interface 114 transmits 80% of the incident light and reflects 20% of the incident light independent (or largely independent) of polarization. In that case, about 80% of the light entering through viewing window 112 may reach observer 106 through proximal beam-splitting interface 114 (instead of only about 50% when proximal beam splitter 110 is a polarizing beam splitter). On the other hand, proximal beam-splitting interface 114 would reflect only about 20% of the light from image former 116 to observer 106. To compensate for the reduced reflectivity, the brightness of light source 120 could be increased. Further, if proximal beam splitter 110 is a non-polarizing beam splitter, then half-wave plate 134 and quarter-wave plate 138 may be omitted.

In an example embodiment, proximal beam splitter 110, distal beam splitter 122 and light pipe 124 are made of glass. However, in order to reduce the weight of optical system 100, some or all of these elements could be made of plastic instead of glass. A suitable plastic material is Zeonex® E48R cyclo olefin optical grade polymer, which is available from Zeon Chemicals L.P., Louisville, Ky. Another suitable plastic material is polymethyl methacrylate (PMMA).

Figure 2:
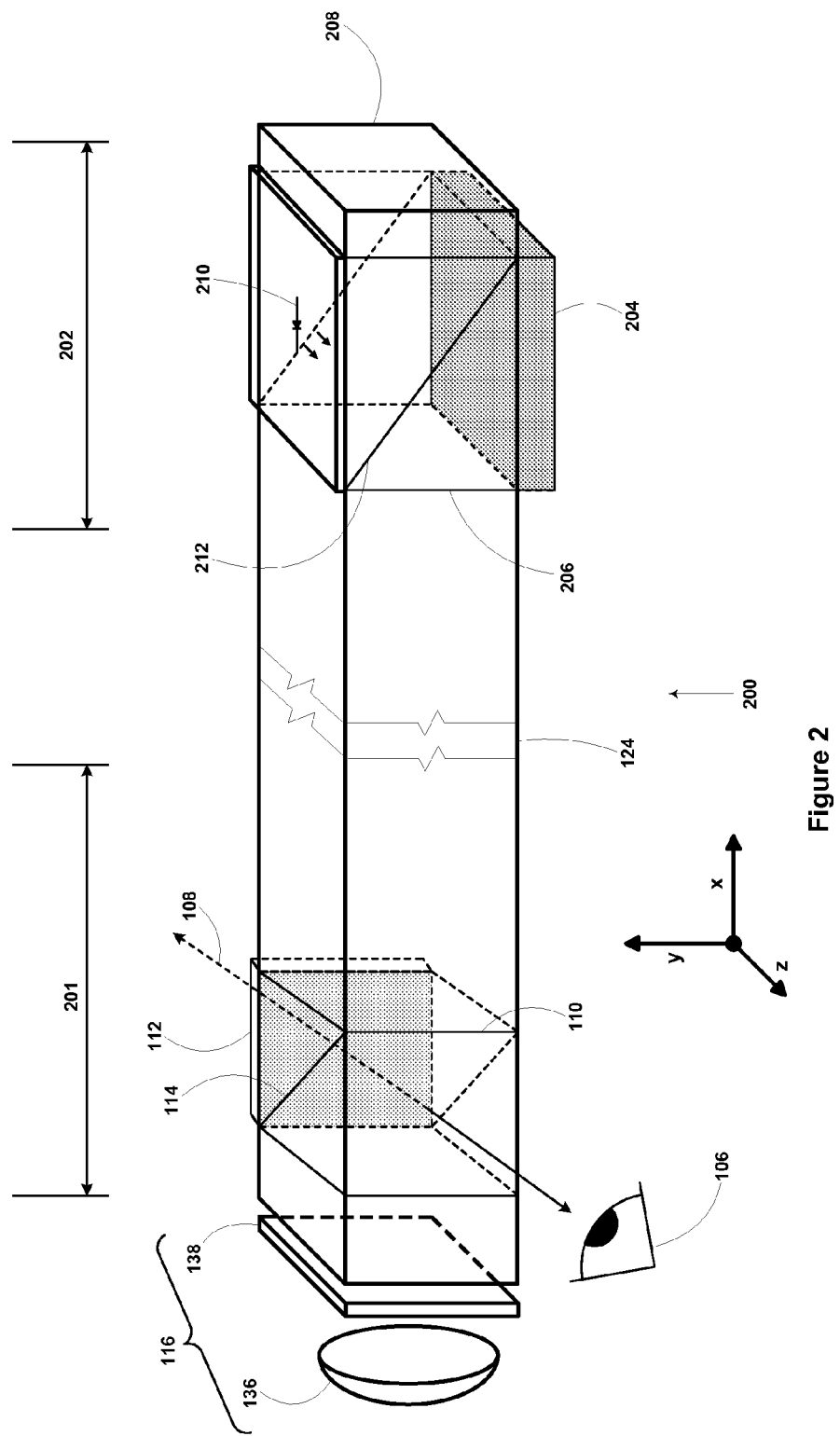
FIG. 2 is a perspective schematic view of an optical system, in accordance with a second example embodiment.

2. Optical System with Horizontally-Mounted Camera and Vertically-Mounted Display Panel FIG. 2 shows a perspective schematic drawing of a second optical system 200. Optical system 200 includes a proximal portion 201 that is the same or similar to proximal portion 102 described above for optical system 100. However, second optical system 200 has a distal portion 202 that is different than distal portion 104 of optical system 100. Specifically, distal portion 202 includes a camera 204 that is configured to image the outside light entering through viewing window 112 in substantially the same way as it is viewable by observer 106 along viewing axis 108. Camera 204 may be configured to capture still images and/or video. In this way, the still images and/or video captured by camera 204 may substantially correspond to the view of the outside world that observer 106 sees when looking through viewing window 112.

To achieve this functionality, while maintaining the ability to generate a virtual image that is viewable along viewing axis 108, distal portion 200 may include a distal beam splitter 206 that is optically coupled to the camera 204, a display panel 208, and a light source 210. Distal beam splitter 206 is also optically coupled to proximal beam splitter 110 via light pipe 124. Distal beam splitter 206 includes a distal beam-splitting interface 212 which, in this example, lies in a plane that is parallel to viewing axis 108. As shown in FIG. 2, camera 204 is horizontally mounted underneath distal beam splitter 206, display panel 208 is vertically mounted on a side of distal beam splitter 206, and light source 210 is mounted above distal beam splitter 206.

In an example embodiment, both proximal beam splitter 110 and distal beam splitter 206 are polarizing beam splitters. In that case, light entering through viewing window 112 may be separated into two paths based on polarization. The p-polarization component of the light entering through viewing window 112 is transmitted through proximal beam-splitting interface 114 so as to be viewable along viewing axis 108. The s-polarization component of the light entering through viewing window 112 is reflected by proximal beam-splitting interface 114 toward distal beam splitter 206. Unlike first optical system 100, second optical system 200 does not include a half-wave plate between its proximal and distal portions. Thus, distal beam-splitting interface 212 receives the s-polarized light reflected by proximal beam-splitting interface 114 and reflects it toward camera 204. In this way, camera 204 is able to image the same view through viewing window 112 as would be seen by observer 106, with the proviso that observer 106 would see the p-polarization component of the light and camera 204 would receive the s-polarization component.

In addition, observer 106 is able to view a virtual image of s-polarized light along viewing axis 108. Image former 116 forms the virtual image from a light pattern generated by the display panel 208. Display panel 208 may generate the light pattern by spatially modulating light from light source 210. In particular, light source 210 may provide s-polarized light (for example, through the use of a linear polarizer) that is preferentially reflected by distal beam-splitting interface 212 toward display panel 208. In one example, display panel 208 is an LCOS display that spatially modulates the s-polarized light incident upon it and also changes its polarization. In this way, display panel 208 may provide spatially-modulated p-polarized light, which, in turn, is transmitted through distal beam-splitting interface 212 and proximal beam-splitting interface 114 to reach image former 116.

As described above for first optical system 100, image former 116 may include a concave mirror 136 and quarter-wave plate 138 so as to form a virtual image from the spatially-modulated p-polarized light and to change its polarization. Thus, image former 116 may form a virtual image of s-polarized light that is reflected by proximal beam-splitting interface 114 so as to be viewable along viewing axis 108.

With the configuration shown in FIG. 2, camera 204 may be mounted on a circuit board (not shown) that extends horizontally under optical system 100 toward proximal portion 102. Display panel 208 may be mounted on a separate circuit board (not shown) which may extend in a plane that is perpendicular to the horizontal axis (x-axis) of optical system 100.

3. Head-Mounted Display

An optical system, such as first optical system 100 or second optical system 200 described above, may be attached to a head-mounted support in a position such that the viewing axis is conveniently viewable by either the left eye or right eye of the wearer. In this way, a head-mounted display (HMD), though which the outside world is viewable, may be provided. The HMD may also function as a wearable computing device.

Figure 3A:
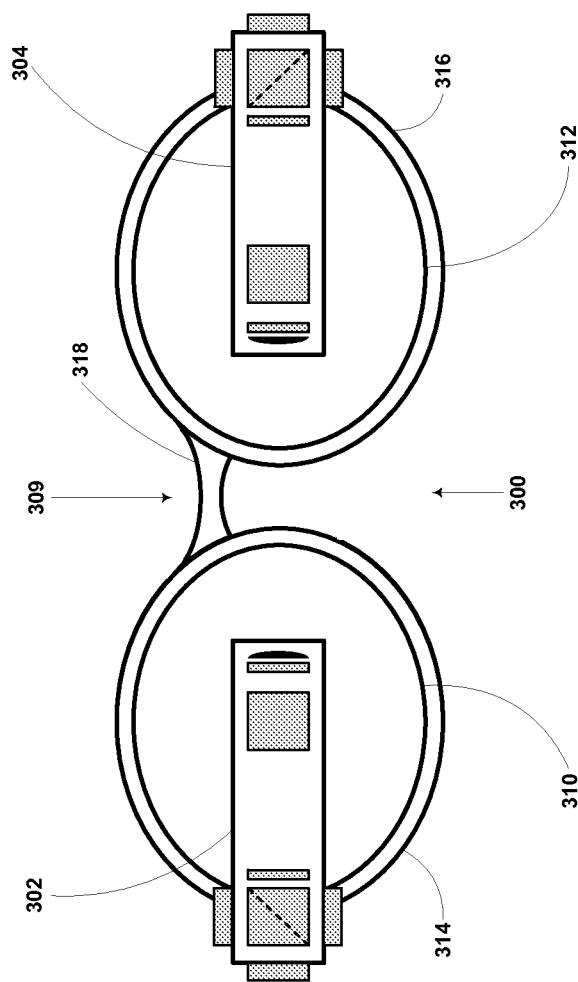
FIG. 3A is a front view of a head-mounted display, in accordance with an example embodiment.
Figure 3B:
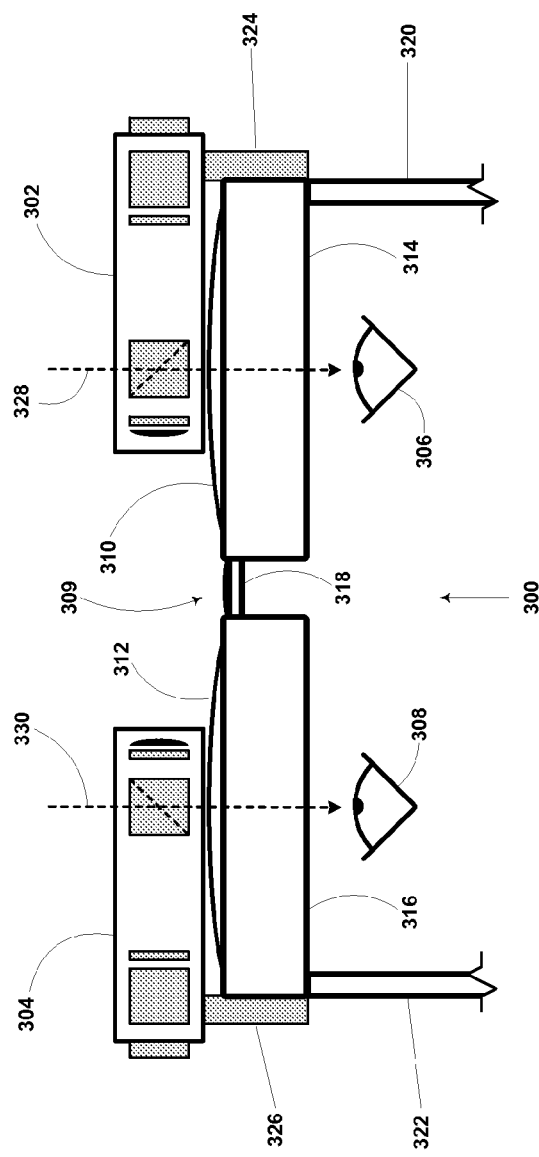
FIG. 3B is a top view of the head-mounted display shown in FIG. 3A, in accordance with an example embodiment.
Figure 3C:
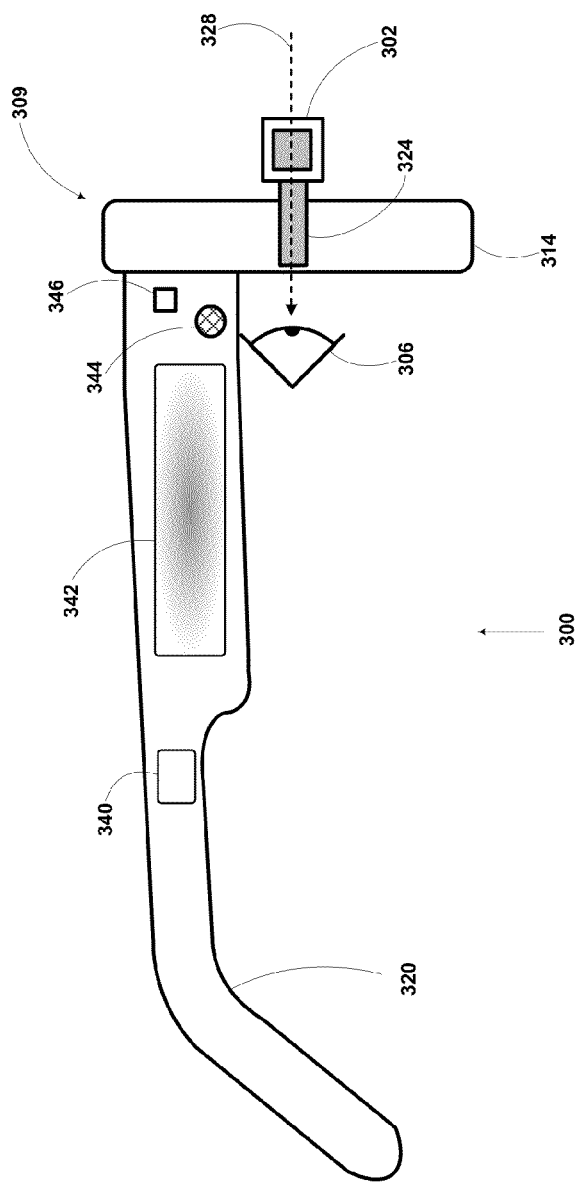
FIG. 3C is a side view of the head-mounted display shown in FIGS. 3A and 3B, in accordance with an example embodiment.

FIGS. 3A, 3B, and 3C illustrate an HMD in which optical systems 302 and 304, for the wearer's right eye 306 and left eye 308, respectively, are attached to a head-mounted support 309. In this example, head-mounted support 309 is configured in the form of eyeglasses with lenses 310 and 312 positioned over right eye 306 and left eye 308, respectively. Lenses 310 and 312 are held in place by respective frames 314 and 316. Head-mounted support 309 also includes a bridge-piece 318 that is connected to frames 314 and 316 and is configured to be supported by the bridge of the user's nose. In addition, head-mounted support 309 includes side-pieces 320 and 322, connected to frames 314 and 316, respectively, which may hook behind the wearer's ears.

Right-side optical system 302 may be attached to frame 314 by means of a mount 324, and left-side optical system 304 may be attached to frame 316 by means of a mount 326. Mounts 324 and 326 position optical systems 302 and 304 so that their respective viewing axes are viewable by the wearer's right eye 306 and left eye 308, respectively. Thus, as shown in FIG. 3B, viewing axis 328 of right-side optical system 302 may extend to the wearer's right eye 306 through lens 310, and viewing axis 330 of left-side optical system 304 may extend to the wearer's left eye 308 through lens 312. To achieve this configuration, mounts 324 and 326 could be fixed mounts, or they could be adjustable by the wearer in order to position optical systems 302 and 304 for proper viewing.

Although FIGS. 3A, 3B, and 3C illustrate HMD 300 with optical systems 302 and 304 separate from lenses 310 and 312 and frames 314 and 316, it is to be understood that other configurations are possible. For example, some or all of the components of optical systems 302 and 304 could be integrated into lenses 310 and 312 and/or frames 314 and 316. For example, the beam splitters and light pipes might be integrated into the lenses and/or the display panels might be integrated into the frames. In addition, although FIGS. 3A, 3B, and 3C illustrate a HMD with an optical system for each eye, other HMD embodiments might include an optical system for only one of the wearer's eyes.

Although head-mounted support 309 has been illustrated in FIGS. 3A, 3B, and 3C and described above as being configured in the form of eyeglasses, other configurations are possible. For example, head-mounted support 309 could be in the form of a helmet or a hat.

4. Wearable Computing Device

As noted above, HMD 300 may function as a wearable computing device. In this regard, HMD 300 may include a computer 340, which could be located inside of or attached to part of head-mounted support 309. For example, computer 340 could be located inside of side-piece 320, as shown in FIG. 3C. However, other configurations are possible.

Computer 340 may be configured to control the display panels in optical systems 302 and 304 in order to control the virtual images that are generated and displayed to the wearer. In the case that optical systems 302 and 304 include cameras, computer 340 may also be configured to control the cameras and to receive the images or video captured by the cameras. Computer 340 may be communicatively coupled to optical systems 302 and 304 by means of wires inside of head-mounted support 309. Alternatively, computer 340 may communicate with optical systems 302 and 304 by means of external wires or by means of a wireless connection.

As a wearable computing device, HMD 300 may also include other components that may be communicatively coupled to computer 340 to provide desired functionality. For example, HMD may include one or more touchpads, microphones, and sensors, which are exemplified in FIG. 3C by touchpad 342, microphone 344, and sensor 346 on side-piece 320. It is to be understood, however, that these components could be located elsewhere in HMD 300. By appropriate touch interaction with touchpad 342, the wearer may control or provide input to HMD 300. Microphone 344 may be used to receive voice commands from the wearer and/or record audio data from the wearer's surroundings. Sensor 346 may include an accelerometer and/or gyroscope configured to sense movement of HMD 300. Additionally, sensor 346 may represent a camera or plurality of cameras that may be configured to observe various fields of view around the HMD 300. HMD 300 may also include a wired and/or wireless interface through which computer 340 may exchange data with other computing systems or other devices. In addition to the foregoing, HMD 300 could also include other types of sensors, user interface components, and/or communication interface components.

Computer 340 may control the content of the virtual images generated in optical systems 302 and 304 in response to various inputs. Such inputs may come from touchpad 342, microphone 344, sensor 346, and/or a wired or wireless communication interface of HMD 300. In the case that optical systems 302 and 304 include cameras, computer 340 may also control the content of the virtual images based on visual data from the cameras. In this way, computer 340 may control the content of the virtual images so that they are appropriate for the wearer's current surroundings and/or tasks in which the wearer is involved.

5. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An optical system, comprising:
   a display panel configured to generate a light pattern;
   an image former configured to form a virtual image from the light pattern generated by the display panel;
   a viewing window configured to allow outside light in from outside of the optical system;
   a proximal beam splitter through which the outside light and the virtual image are viewable along a viewing axis; and
   a distal beam splitter optically coupled to the display panel and the proximal beam splitter, wherein the distal beam splitter has a beam-splitting interface in a plane that is parallel to the viewing axis.

2. The optical system of claim 1, further comprising: a light source optically coupled to the distal beam splitter.

3. The optical system of claim 2, wherein the light source comprises a light-emitting diode (LED) or laser diode.

4. The optical system of claim 2, wherein the display panel is configured to generate the light pattern by spatially modulating light from the light source to provide spatially-modulated light.

5. The optical system of claim 4, wherein the display panel comprises a liquid-crystal-on-silicon (LCOS) display panel or a digital light projector (DLP) micro-mirror display.

6. The optical system of claim 4, wherein the beam-splitting interface of the distal beam splitter is configured to reflect toward the proximal beam splitter at least a portion of the spatially-modulated light provided by the display panel.

7. The optical system of claim 6, further comprising a reflector optically coupled to the distal beam splitter.

8. The optical system of claim 7, wherein the beam-splitting interface of the distal beam splitter is configured to reflect toward the reflector at least a portion of the light from the light source, wherein the reflector is configured to reflect at least a portion of the light from the light source that has been reflected by the beam-splitting interface of the distal beam splitter, and wherein the beam-splitting interface of the distal beam splitter is further configured to transmit at least a portion of the light reflected by the reflector so that it reaches the display panel.

9. The optical system of claim 8, wherein the beam-splitting interface of the distal beam splitter is configured to preferentially reflect s-polarized light and preferentially transmit p-polarized light.

10. The optical system of claim 9, wherein the light source comprises a linear polarizer configured to selectively transmit s-polarized light.

11. The optical system of claim 10, wherein the reflector is configured to reflect s-polarized light from the light source as p-polarized light.

12. The optical system of claim 11, wherein the reflector comprises a plane mirror and a quarter-wave plate.

13. The optical system of claim 11, wherein the display panel is configured to spatially modulate p-polarized light from the reflector to provide s-polarized spatially-modulated light.

14. The optical system of claim 13, further comprising a half-wave plate between the distal beam splitter and the proximal beam splitter, wherein the half-wave plate is configured to convert the s-polarized spatially-modulated light into p-polarized spatially-modulated light.

15. The optical system of claim 14, wherein the proximal beam splitter has a beam-splitting interface that is configured to preferentially reflect s-polarized light and preferentially transmit p-polarized light.

16. The optical system of claim 15, wherein the beam-splitting interface of the proximal beam splitter is configured to transmit at least a portion of the p-polarized spatially-modulated light from the half-wave plate so that it reaches the image former.

17. The optical system of claim 16, wherein the image former is configured to reflect the p-polarized spatially-modulated light transmitted through the proximal beam splitter as s-polarized image-forming light, and wherein the beam-splitting interface of the proximal beam splitter is configured to reflect at least a portion of the s-polarized image-forming light such that it is viewable along the viewing axis as the virtual image.

18. The optical system of claim 17, wherein the outside light that is viewable along the viewing axis is p-polarized.

19. The optical system of claim 17, wherein the image former comprises a concave mirror and a quarter-wave plate.

20. The optical system of claim 4, wherein the beam-splitting interface of the distal beam splitter is configured to transmit at least a portion of the spatially-modulated light provided by the display panel so that it reaches the proximal beam splitter.

21. The optical system of claim 20, wherein the beam-splitting interface of the distal beam splitter is configured to reflect toward the display panel at least a portion of the light from the light source.

22. The optical system of claim 20, further comprising a camera optically coupled to the distal beam splitter.

23. The optical system of claim 22, wherein the proximal beam splitter has a beam-splitting interface that is configured to reflect toward the distal beam splitter at least a portion of the outside light that is viewable along the viewing axis.

24. The optical system of claim 23, wherein the beam-splitting interface of the distal beam splitter is configured to reflect toward the camera at least a portion of the outside light reflected by the beam-splitting interface of the proximal beam splitter.

25. The optical system of claim 1, wherein the display panel comprises an emissive display.

26. The optical system of claim 25, further comprising a linear polarizer over the emissive display.

27. The optical system of claim 25, wherein the emissive display is an organic light emitting diode (OLED) display.

28. A head-mounted display, comprising:
   a head-mounted support; and
   an optical system attached to the head-mounted support, wherein the optical system comprises:
      (a) a display panel configured to generate a light pattern;
      (b) an image former configured to form a virtual image from the light pattern generated by the display panel;
      (c) a viewing window configured to allow outside light in from outside of the optical system;
      (d) a proximal beam splitter through which the outside light and the virtual image are viewable along a viewing axis; and
      (e) a distal beam splitter optically coupled to the display panel and the proximal beam splitter, wherein the distal beam splitter has a beam-splitting interface in a plane that is parallel to the viewing axis.

29. The head-mounted display of claim 28, wherein the outside light and the virtual image are viewable by a wearer of the head-mounted display.

30. The head-mounted display of claim 28, wherein the image former, proximal beam splitter, and distal beam splitter are arranged along a horizontal axis that is perpendicular to the viewing axis.

31. The head-mounted display of claim 30, wherein the display panel is mounted on a circuit board, and wherein the circuit board is in a horizontal plane that is parallel to the horizontal axis.

32. The head-mounted display of claim 31, wherein the display panel is below the distal beam splitter.

33. The head-mounted display of claim 28, wherein the image former, proximal beam splitter, distal beam splitter, and display panel are arranged along a horizontal axis that is perpendicular to the viewing axis.

34. The head-mounted display of claim 33, further comprising a camera that is optically coupled to the distal beam splitter, wherein the camera is mounted on a circuit board, and wherein the circuit board is in a horizontal plane that is parallel to the horizontal axis.

35. A wearable computing device, comprising:

a head-mounted support;

an optical system attached to the head-mounted support, wherein the optical system comprises:

(a) a display panel configured to generate a light pattern;

(b) an image former configured to form a virtual image from the light pattern generated by the display panel;

(c) a viewing window configured to allow outside light in from outside of the optical system;

(d) a proximal beam splitter through which the outside light and the virtual image are viewable along a viewing axis; and (e) a distal beam splitter optically coupled to the display panel and the proximal beam splitter, wherein the distal beam splitter has a beam-splitting interface in a plane that is parallel to the viewing axis; and a computer, wherein the computer is configured to control the display panel.

* * * * *